(12) United States Patent
Hardin

(10) Patent No.: US 7,233,252 B1
(45) Date of Patent: Jun. 19, 2007

(54) METHOD AND SYSTEM OF SEWER SCANNING FOR WATER CONSERVATION

(76) Inventor: Greg Hardin, 970 FM 2871, Fort Worth, TX (US) 76126

(*) Notice: Subject to any disclaimer, the term of this patent is extended or adjusted under 35 U.S.C. 154(b) by 170 days.

(21) Appl. No.: 11/166,024

(22) Filed: Jun. 23, 2005

(51) Int. Cl.
*G08B 21/00* (2006.01)

(52) U.S. Cl. .................. 340/606; 340/603; 340/605; 340/618; 340/622; 348/84; 348/85; 348/143

(58) Field of Classification Search .............. 340/603, 340/606, 605, 609, 610, 616, 618–625; 348/61, 348/84, 85, 143
See application file for complete search history.

(56) References Cited

U.S. PATENT DOCUMENTS 7,002,481 B1 * 2/2006 Crane et al. ............... 340/618

* cited by examiner

*Primary Examiner*—Jeffery Hofsass
*Assistant Examiner*—Hongmin Fan

(57) ABSTRACT

Method of monitoring water conservation in an apartment complex by positioning infrared cameras with motion sensors in the clean outs of the waste water discharge lines leading to public sewer systems wherein each camera image is displayed on a computer screen and the motion sensors, which start and stop the digital video recorders (DVR), are adjusted by circumscribing the area of the camera image and the pixel sensitivity setting for motion sensors activation, which triggers the DVR recordings. In this arrangement the intermittent or constant flow of waste water is detected in real time indicating normal or abnormal flow of waste water, respectively. Further, an infrared camera may be positioned on the apartment complex side of the water meter to determine in real time if water is being supplied to the complex and the waste water flow out is little or none then loss of water outside the plumbing system from overflowing commodes, tubs, lavatories or broken pipe is indicated.

17 Claims, 3 Drawing Sheets

METHOD AND SYSTEM OF SEWER SCANNING FOR WATER CONSERVATION

BACKGROUND OF THE INVENTION

1. Field

This invention relates to a method and system of sewer scanning for monitoring fluids, primarily water being discharged from a building through a series of drains and uncontained flow from drain system failures or accidents. Furthermore, the invention provides for monitoring and control of the fluid or water sources in single or multi-family residential structures to prevent overflow and backup of uncontrolled water discharge.

2. State of the Art

Various systems for monitoring water or fluid flowing in fluid discharge conduits have been proposed to determine flow rates and volumes, and/or to determine backups or overflow of water in the systems.

Alarm systems for sewer lines have been utilized in the past for detecting blockage or backup by use of pressure sensors in the access or clean out sections of sewer lines. The majority of such arrangements determine the currents or some unusual stoppage but fail to identify the location of the particular uncontrolled discharge, such that the problem area can be detected and corrected before substantial problems or damages occur. Most of the monitoring of the water supply to buildings and residential dwellings are usually provided by well known water metering systems, which determine the volume of water entering the structure.

One of the problems in the existing systems of monitoring water discharges from structures is lack of correlation between the water supply to the structure and the volume discharged through drain and sewer lines; thus back up of commodes, sinks, utility room overflows are not detected by input meters or sewer discharge monitors, thus flow onto the bathroom floor from sinks or commodes could go undetected for extended periods of time when the occupants are not present.

Various metering systems for water discharge systems are known in the art. U.S. Pat. No. 5,942,698 issued to Stevens describes a virtual sewer flow monitor that detects flow rate and depth periodically and supplies it to a scatter graph generator and a polynomial curve generator therefore. A filter eliminates polynomial curve corresponding to normal sewer flow and an SSO detector responds to curve portions indicating an overflow to generate an alarm.

U.S. Pat. No. 5,006,833 issued to Marlowe, et al. teaches a sewer line restriction alarm placed in the clean out which includes a diaphragm which moves in response to the restriction and sets off an alarm.

U.S. Pat. No. 4,973,950 issued to Tourtillott discloses a sewer blockage alarm having a pressure sensor in the top of a clean out branch section that is connected to a large diameter pressure multiplying pressure bell. This arrangement set off a visual and audible indicator warning of a down stream blockage of a residential plumbing system to avoid a backup into the residence.

U.S. Pat. No. 4,407,158 issued to Petroff discloses a flow measurement system wherein separately located monitors record synchronized and time identified pressure measurements with pressure-to-signal transducers on the bottom of pipes. A recorder records the pressure each signal and monitor identity which is furnished to a pressure-to-flow computer which provides location identified, time synchronized, flow data for the system.

U.S. Pat. No. 5,862,775 issued to Stroud discloses a riser system with an inflatable balloon with a flag. The balloon can be inflated or deflated without removing the sewer cover. The flag rises with the balloon indicating a possible back-up of the sewer line.

SUMMARY OF THE INVENTION

Principal object of the present invention is to provide a new and improved method and system of sewer scanning for monitoring dwellings by a system of monitors or scanners strategically located in the main water discharge or sanitation line from the dwelling with each monitor transmitting data to a central location for analyzing and monitoring the particular areas of concern.

Another object of the invention is to provide a system for monitoring the presence of water in multiple main water discharge or sanitation lines from a building in locations where the presence of water indicates a condition for potential damages, such a system including a detector or scanner capable of sending signals to a remote location, a receiver capable of collecting information at the remote location, processing such information to determine the actual location of the signal indicating potential damage and taking appropriate action or activating equipment capable of shutting down the water supply to the location creating the potential damage.

Another object of the invention is to monitor waste water being discharged from a single dwelling or various units of a multi-unit housing facility by monitoring flowing waste water, wherein the monitor constitutes a motion sensor equipped digital video camera coupled to a digital video recorder for indicating normal or excessive flow characteristic and processing the same to provide a real time motion graph display.

Another object of the invention is to provide a system for monitoring the flow conditions in a sewer line clean out, or sanitary T, of a building by providing a motion detector activated infrared camera installed in the clean out coupled to a remote digital video recorder (DVR) which provides data to generate real time motion graph displays.

An additional object of the invention is to lower a digital infrared camera with motion sensors into a clean out of a sewer while attached to a hand held monitor to obtain the best placement therein, then secure it in the clean out and attached to a digital video recorder (DVR). With the camera properly positioned in the clean out stand pipe, the flow conditions of the sewer line are monitored over a period of between 6 to 48 hours and preferably between 24 to 48 hours in real time.

Still, an additional object of the invention is to install motion sensor equipped infrared cameras in the clean outs of various apartment units in an apartment complex which individually monitor the flow of the waste water stream to determine intermittent flow or constant flow. The relative quantity of flow can be determined by the width of the waste water stream observed by the monitoring system. The motion sensor is preset for a normal level of flow in order to discriminate normal usage by occupants from excess leakage from defective apparatus in buildings or apartments such as commodes, lavatories, bathtubs, sinks, etc.

Still, an additional object of the invention is to install motion sensor equipped infrared cameras in the clean outs of various apartment units in an apartment complex which individually monitor the flow to determine intermittent flow or constant flow. The relative quantity of flow can be determined by the width of the flow observed by the monitoring system. The motion sensor is preset for a normal level of flow in order to discriminate normal usage by occupants from excess leakage caused by defective apparatus in buildings or apartments such as commodes, lavatories, bathtubs, sinks, etc. Also by coordinating in real time the water meter water flow into the apartments with the flow of the waste water stream discharged therefrom excess inflow over outflow from the apartment units can be determined which would indicate wild water or water escaping through overflowing commodes, lavatories, dishwashing machines, etc., as well as broken pipes.

BRIEF DESCRIPTION OF DRAWINGS

The features of the invention will be appreciated from the drawings, wherein.

DETAILED DESCRIPTION OF PREFERRED EMBODIMENT

Figure 1:
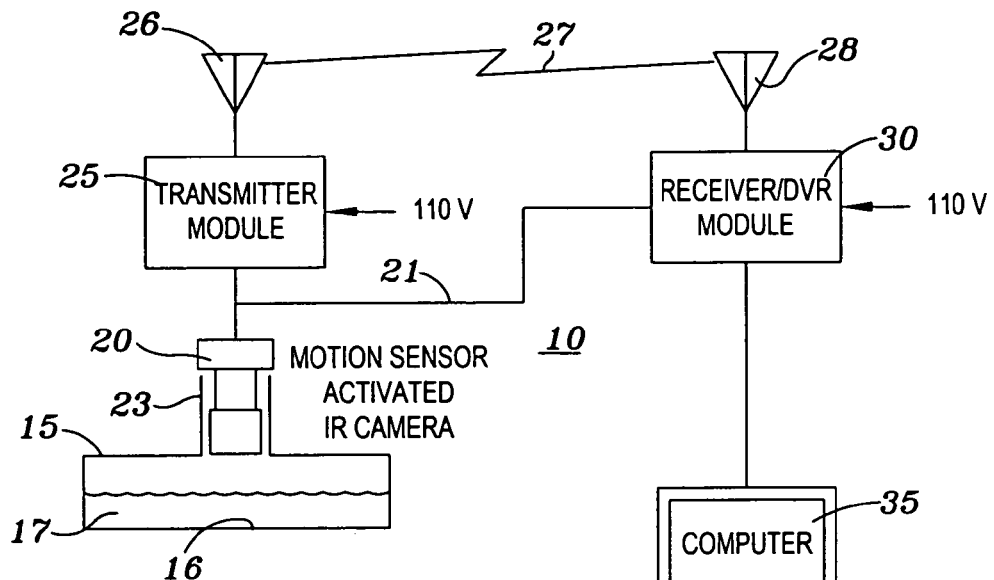
FIG. 1 is a schematic diagram illustrating a system of fluid monitoring units for detecting fluid discharge, transmitting the data through a coaxial cable or RF signal to a receiver/DVR module, signal processor and computer.
Figure 2:
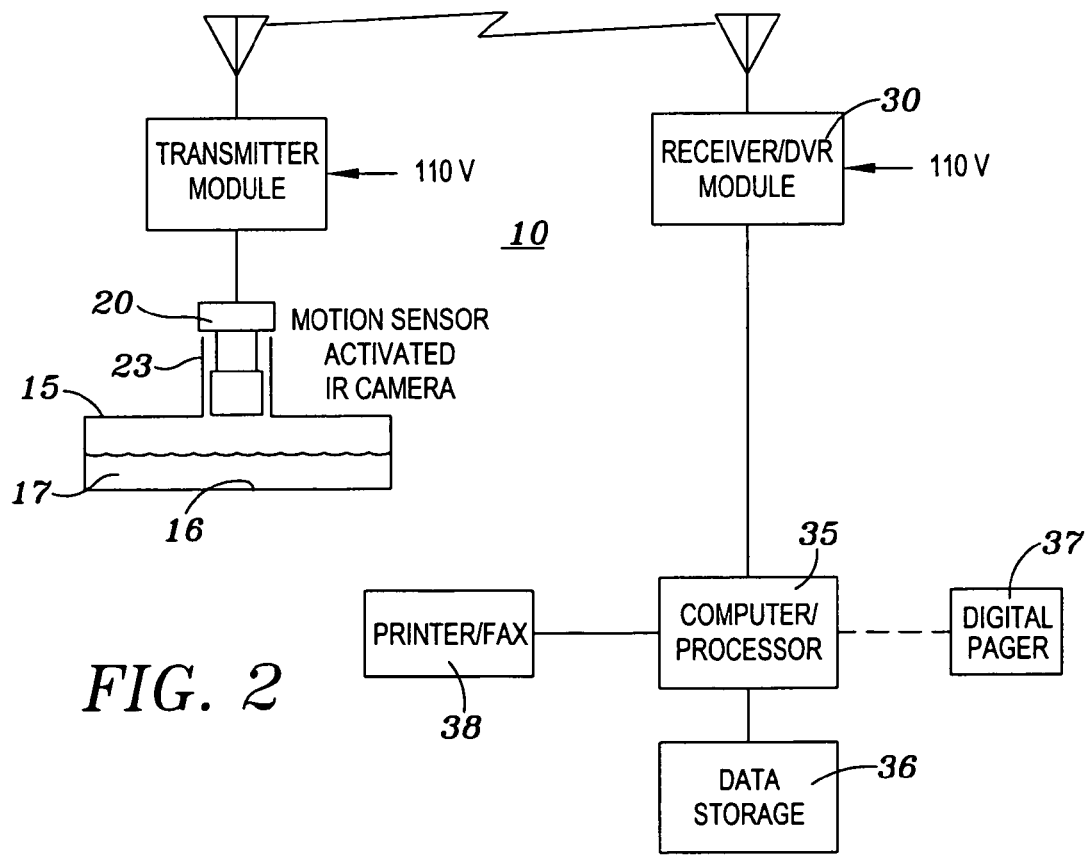
FIG. 2 is a similar schematic diagram to FIG. 1 and includes a data storage unit, a computer for analyzing data and a printer/fax equipment to transmit information to a more remote location, and also a digital pager for alerting an individual on the premise.
Figure 3:
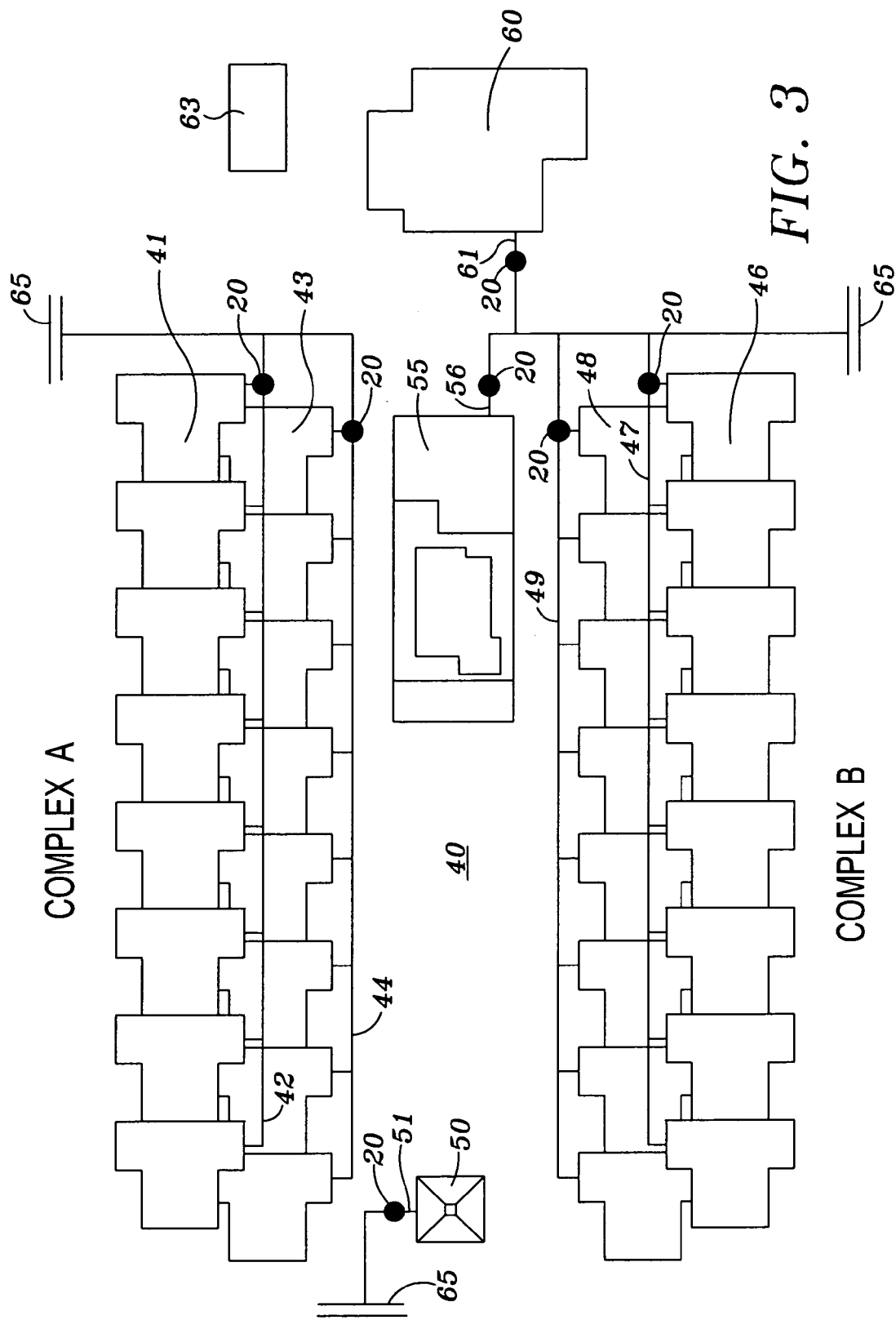
FIG. 3 is a schematic diagram illustrating the main water discharge lines and monitor locations for a multi-dwelling complex.

Referring to the drawings and more particularly FIGS. 1, 2 and 3, a system generally referred to as 10, includes digital infrared camera unit 20 secured in an inspection or clean out stand pipe 23 of fluid drain or sewer line 15. Infrared camera unit 20 includes a digital infrared camera and a motion sensor to activate the camera. In association with infrared camera unit 20 is transmitter module 25 for processing infrared camera data into signals 27, and has antenna 26 for emitting signals 27, which are received by antenna 28 of receiver/digital video recorder (DVR) module 30 and then processed in computer 35. Instead of generating RF signal 27, infrared camera Unit 20 is coupled by coax cable 21 directly to receiver/digital video recorder (DVR) 30. Computer 35 is provided with data storage unit 36. Computer 35 may also provide information to pager 37 and to printer/fax apparatus 38 to provide a printed report at the location of computer 35 or transmitted by telecopier to a more remote location. Computer 35 provides a real time display of motion graphs of the intermittent or constant flow, level or other characteristics of waste water 17.

System 10 is useful in apartment complex 40 as viewed in FIG. 3. Specifically referring to FIG. 3, there are two separate apartment buildings referred to as Complex A and Complex B. As illustrated, Complex A has eight upstairs apartments 41 with lateral drain lines 42 and eight downstairs apartments 43 with lateral drain lines 44. Similarly, Complex B has upstairs apartments 46 with lateral drain lines 47 and downstairs apartments 48 with lateral drain lines 49. Apartment complex 40 has vehicle wash area 50, swimming pool complex 55 and office area 60. Vehicle wash area 50 has drain line 51; the swimming pool complex 55 has drain line 56 and office area 60 has drain line 61. Lateral waste water or drain lines 42, 44, 47, and 49 and drain lines 51, 56, and 61 have digital infrared camera units 20, mounted in their respective clean outs, which monitor the flow from apartment complex 40 to main city sewer line 65.

It should be apparent that any multiple dwelling structure containing office or hotel rooms can be monitored in accordance with system 10 to provide an indication of waste water disposal throughout a complex such as apartment complex 40.

The infrared camera Unit 20, is placed with the camera lens 8" to 18" from the bottom of the sewer line 15, but always keeping the camera in the clean out 23 above sewer line 15 so the camera does not impede flow in sewer line 15 or come in contact with it. The motion sensor is positioned on the camera such that the camera field of view is the same as the motion sensor. The camera is "set" and "turned on" in order to get a full picture on the screen of computer 35 of the flow in the sewer line 15.

The DVR and motion detector or sensor from the manufacturer includes software which allows the user to set which portions of the digital camera image where motion will cause the motion sensor to activate the digital video recorder and portions of the digital camera image where motion will be masked or ignored by the motion sensor. This can be accomplished by circumscribing or drawing motion boxes about the portions of the camera image where motion will cause the motion sensor to activate the digital video recording. Further, the pixel change sensitivity of the motion sensor may be adjusted between small and extreme pixel changes before it triggers the digital video recorder in response to motion in the selected portions of the camera image.

Circumscribing portions or drawing motion sensor boxes about the camera image wherein the motion sensor triggers the camera to record are part of the DVR technology through the software program that comes with the DVR. You merely use your mouse, point the cursor in the desired spot and circumscribe portions or draw a box of any size and any number that is needed to track the flow of waste water in the sewer line clean out at any time, 24 hours a day. Looking straight down through the clean out into the sewer line with a small stream of fluid in the bottom of it, one observes as the flow gets bigger the column of fluid gets wider and fluctuates up and down as more or less fluid enters the sewer line. By drawing the motion sensor boxes or circumscribing areas of the camera image in the right spot, we are able to determine by motion in the selected areas if there is a consistent flow and the stream width. A "High Water Alarm" motion box may be drawn up in the clean out stand pipe camera image and if motion is detected therein, it trips an alarm that will beep and notify a maintenance man of a possible sewer overflow both in apartments and out on the ground.

If the software motion sensor boxes detect motion within the boxes, then to exclude motion of a narrow waste water stream the motion boxes would be drawn on either side of the narrow waste water stream and no motion would be detected until the width of the waste water steam encroached into the motion sensor boxes. Likewise, if the motion sensor boxes were designed to exclude motion then the motion box would be drawn around the narrow waste water system.

We also put a camera on the main water meter 63 that serves the property, by monitoring the clean out 23 and the water meter 63 flow we are able to determine if the leak is inside or outside the plumbing system to the sewer line 15.

Figure 4:
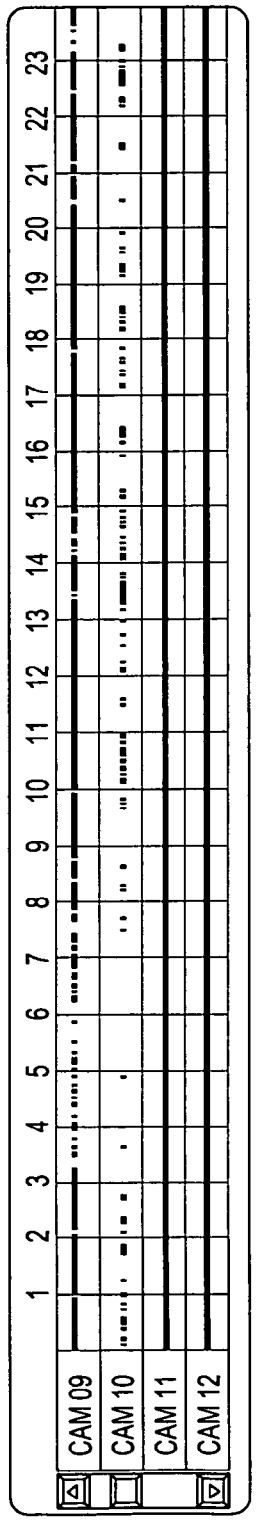
FIG. 4 is a replica illustrating the flow of the waste water in the drain lines at the clean outs upon initial installation of the monitoring system.
Figure 5:
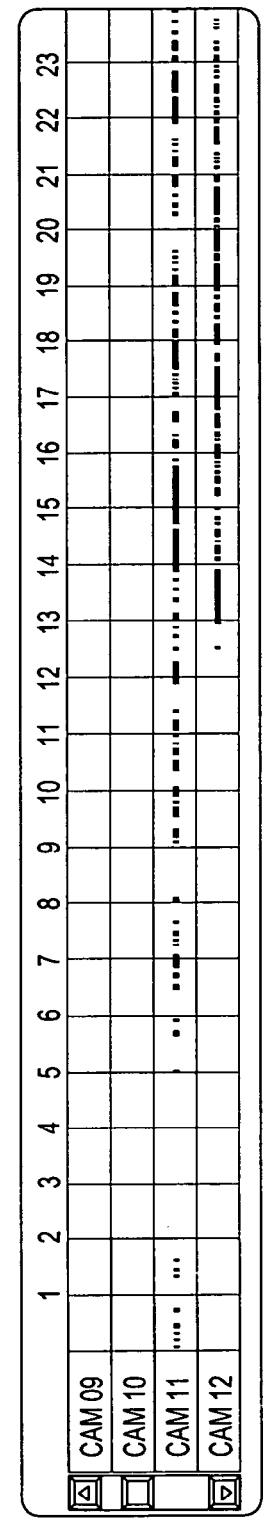
FIG. 5 is a replica illustrating the flow of the waste water in the drain lines at the clean outs after repair of leaks indicated by the monitoring system causing the excessive flow of waste water.

Referring now to FIGS. 3, 4 and 5, it will be considered that CAM 9 is located in clean out for Apartments 41 indicated as IR camera Unit 20, CAM 10 in clean out for Apartments 48 indicated as IR camera Unit 20, CAM 11 in clean out for Apartments 43 indicated as IR camera Unit 20, and CAM 12 in clean out for Apartments 46 indicated as IR camera Unit 20. After installing the IR camera Units 9, 10 11 and 12, the results of waste water 17 flowing from Apartments 41 (see CAM 9) indicates heavy use, however, since the flow is intermittent the integrity of the plumbing system in Apartment 41 is intact. Also, waste water flowing from Apartments 48 (see CAM 10) indicates light use with very intermittent flow, the integrity of the plumbing system in Apartment 48 is intact.

Initial operation of CAM 11 in the clean out for Apartment 43 indicates a continuous flow of waste water flowing through this clean out. The integrity of the plumbing system in Apartments 43 is breached and there is one or more faulty commodes, lavatory faucets, etc. which require maintenance. In Apartments 46 with CAM 12 in the clean out there is continuous flow of waste water and again the integrity of the plumbing system is breached which requires maintenance.

The monitoring of CAM 9, CAM 10, CAM 11 and CAM 12 may be set to detect waste water streams of just a trickle (less than an inch in width) up to the diameter of sewer line 15. Further, the pixel change sensitivity may be set such that very little pixel change will activate motion sensors on the infrared cameras to start the digital video recorders. Consequently, CAM 9, CAM 10, CAM 11 and CAM 12 may be adjusted by locating motion sensor boxes on the camera image and setting pixel changes sensitivity to accomplish optimum result to conserve water.

The invention claimed is:

1. A method of detecting abnormal discharge of a waste water stream into a sewer system leading from a building and initiating appropriate action comprising:
   (a) mounting an infrared camera, with a motion sensor for starting and stopping the camera, at an appropriate location to the flow of the waste water stream in a clean out of the sewer system;
   (b) coupling the camera to a digital video recorder to transmit data from the camera thereto whenever flow of the waste water stream is detected;
   (c) processing the data to create a real time visual display of the flow of the waste water stream; and
   (d) initiating an alarm system in response to a continuous flow of the waste water stream over a substantial period of time.

2. The method of claim 1 including setting the motion sensor such that motion is not detected unless the width of the waste water stream is greater than one-half inch.

3. The method of claim 1 including setting the motion sensor pixel change sensitivity to detect motion of the waste water stream exceeding one-half inch in width.

4. The method of claim 2 including setting the motion sensor pixel change sensitivity to detect motion of the waste water stream exceeding one-half inch in width.

5. A method of monitoring water conservation in an apartment complex comprising:
   (a) installing an infrared camera with a motion sensor for triggering a digital video recorder in a clean out of a sewer line leading from the apartment complex to a public sewer system;
   (b) coupling the camera with the motion sensor to the digital video recorder for collecting data from the infrared camera whenever a pre-selected flow of a waste water stream is detected by the motion sensor to trigger the digital video recorder;
   (c) processing the data to provide a display in real time of the flow of the waste water stream in the clean out;
   (d) further processing the data from the infrared camera to detect continuous flow of the waste water stream through the clean out above a pre-selected flow of the waste water stream; and
   (e) activating a warning system for the clean out with continuous flow of the waste water stream in excess of the pre-selected flow.

6. The method of claim 5 including:
   (i) monitoring in real time inflow of water entering the apartment complex; and
   (ii) comparing the inflow of water with the flow of the waste water stream in the clean out to establish the integrity of the water inflow substantially equal to the outflow from the apartment complex over a period of 24 to 48 hours.

7. The method of claim 5 wherein the pre-selected flow being processed is the width of the waste water stream.

8. The method of claim 5 wherein the pre-selected flow being processed is the pixel changes of the waste water stream.

9. The method of claim 8 wherein the pre-selected flow being processed includes the pixel changes of the waste water stream.

10. A method of maintaining water conservation in a building with a water supply inflow and a plumbing system including a sewer line exiting the building for disposal of a waste water stream, the sewer line having a clean out therein comprising:
    (a) equipping an infrared digital camera with a motion sensor with the same field of view as the infrared digital camera;
    (b) mounting the infrared digital camera with motion sensor in the clean out to monitor flow of the waste water stream;
    (c) coupling the infrared digital camera with motion sensor to a digital video recorder for receiving data from the digital camera;
    (d) processing the data from the digital video recorder to display the camera image on a computer screen;
    (e) circumscribing certain portions of the camera image on the computer screen to define where only motion therein will trigger the motion sensor to activate the digital video recorder;
    (f) creating a motion graph from the digital video recorder indicating intermittent flow of the waste water stream as not being a problem or continuous flow of the waste water stream being a problem; and
    (g) initiating corrective action for continuous flow of the waste water stream over a period of six to twelve hours.

11. The method of claim 10 including setting the pixel change sensitivity of the motion sensor above the level of pixel change detected in the flow of waste water steam one-half of an inch in width.

12. The method of claim 10 including circumscribing certain portions of the camera image excluding a waste water stream no wider than one-half inch.

13. The method of claim 10 including circumscribing the camera image portion of the clean out stand pipe to detect motion indicating the waste water stream is backing up into the clean out.

14. The method of claim 10 including coupling the infrared digital camera to the digital video recorder by a coaxial cable.

15. The method of claim 10 including coupling the infrared digital camera to the digital video recorder by wireless equipment.

16. A method of maintaining water conservation in a building with a water supply inflow and a plumbing system including a sewer line exiting the building for disposal of a stream, the sewer line having a clean out therein comprising:
    (a) equipping an infrared digital camera with a motion sensor with the same field of view as the infrared digital camera;
    (b) mounting the infrared digital camera with motion sensor in the clean out to monitor flow of the waste water stream;
    (c) coupling the infrared digital camera with motion sensor to a digital video recorder for receiving data from the digital camera;
    (d) processing the data from the digital video recorder to display the camera image on a computer screen;
    (e) circumscribing certain portions of the camera image on the computer screen to define where motion will not trigger the motion sensor to activate the digital video recorder;
    (f) creating a motion graph from the digital video recorder indicating intermittent flow of the waste water stream as not being a problem or continuous flow of the waste water stream being a problem; and
    (g) initiating corrective action for continuous flow of the waste water stream over a period of six to twelve hours.

17. The method of claim 16 including circumscribing only the area of the camera image where flow of the waste water stream is less than one-half inch wide.

* * * * *